8561X
O. & D. Parker,
Clapboard Machine.
Patented Dec. 24, 1834.
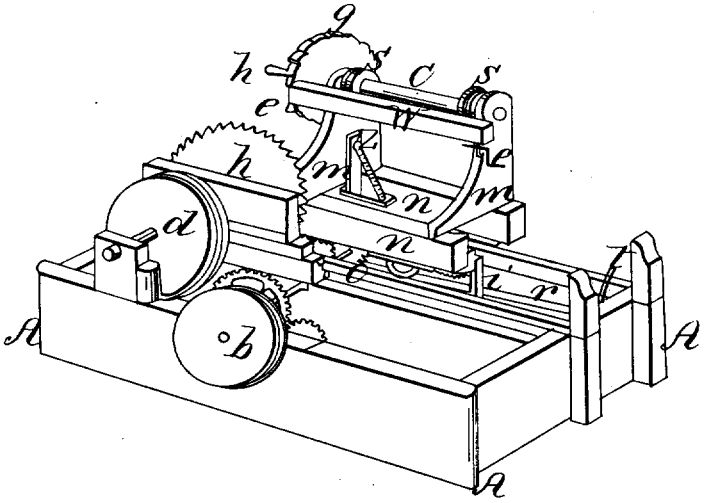
AM. PHOTO-LITHO CO. N.Y. (OSBORNE'S PROCESS)

Dec. 24. 1834 8561X

Otis Parker and Daniel Parker of Hubbard=
ston in the County of Worcester and Commonwealth of Massachu=
setts.

Letters Patent.

The Schedule referred to in these Letters Patent and making part of the same, containing a description in the words of the said Otis Parker & Daniel Parker themselves of their improvement in the method of sawing clapboards by means of a Machine called "a clapboard Machine".

To all to whom these presents shall come.

Be it known, that we, Otis Parker & Daniel Parker, both of Hubbardston in the County of Worcester and Common=wealth of Massachusetts, Millers, have invented, made, con=structed & applied to use a new and valuable improvement in the method of sawing Clapboards, by means of a Machine called a Clapboard Machine.- specified and described in the words following, to wit, The Machine now in use for sawing Clapboards being mostly designed for parts of the Country where timber is very abundant, are constructed in such a way as to cause a prodigal waste of timber. The machines too, are built at an in=convenient expense. Our Machine it is believed, is free from both of these difficulties, and cures another evil which is the subject of much complaint, to wit, The edge of the Clapboard. Our Machine performs the work in such a way as to leave the edge of the Clapboard of the proper thickness.

The frame upon which the Machine rests is made of firm wood, and is in the form of a Parallelogram. Paralle to the sides of the frame and at nearly an equal distance from them, being between them, are two beams firmly connected to the cross pieces at each end of the frame. The Drawing The carriage bearing the timber to be sawed, rests on one of
these beams, and upon the side of the frame. Upon the
carriage are two circular head-blocks, upon which the
timber to be sawed rests. Through the tops of these head=
blocks passes a roller, having firmly attached to one end
of it, a ratch-wheel, & also a crank. Near each end of this roller
is a rope. One end of each of these ropes is fastened to the
roller, so that when the roller is turned by the crank, the
ropes are wound round it. The other ends of the ropes
are fastened to the ends of a piece of wood, each end of
which rests upon the head-blocks. This piece of wood or
bar, is accomodated with a dog at each end to hold the stick
or timber to be sawed. The timber is placed upon the head
blocks and the under side of this bar, and by turning the
roller the timber is drawn upwards. When it is drawn up to
the proper place, it is there held by means of the ratch-
wheel which is also accomodated with a dog or catch. This
catch is lifted out of the ratch wheel as often as the carriage
goes back, and the weight of the timber brings it down throu
... a space equal to the thickness of the back of the clapboard
and this space is regulated by the distance between the teeth
of the ratch wheel.

We use the circular saw upon the same shaft
with the saw is a pulley, for a band to connect the Machine
with the moving power. There is another shaft, having also a
pulley, and band to connect it with the other pulley. Upon
this last shaft is the necessary gearing to move the carriage Explanation of the drawing — A.A.A. Frame of the Machine
b. saw. d. pulley upon the same shaft with the saw. m.m. Circular
blocks. n.n. Carriage bearing the head blocks. o. Roller. s.s. Ropes pass
over and attached to the roller, g. Ratch-wheel. h. Crank. e.e. do[illegible]
to confine the timber to be sawed. w. The bar to which the[illegible]
are attached & under which the timber is placed. [illegible] a pa[illegible]

8561X of the catch or dog for the ratch wheel g. i. a pin for rai-
-ing the catch I. V. Leaver for throwing the carriage out of gear
v. a part of the leaver. b pulley. o. pinion for moving the carriage Operation of the Machine.— The stuff for clapboa
is prepared in a common saw mill, by quartering the
logs, and cutting the required length. The sharp edges of
these quarters are then cut off so as to leave them of the
desired width of the clapboards. They are then spotted or
fixed for placing them upon the head-blocks. when a stick
prepared in this way, it is placed under the bar W. and fas-
tened by the dogs e,e; The machine is put in motion, and
when the carriage has passed by the saw, the pinion o. is thro
out of the catch attached to the bottom of the carriage. and
by means of a weight, the carriage is drawn back to its
original position; and as it passes back the catch or
dog is raised out of the ratch-wheel g. and the wheel g. on
the roller c. is turned by means of the weight of the timbe
attached to the bar W. and the timber slides down up
the circular head-blocks, a space equal to the thickne
of the back or thick edge of the clapboard. when it ha
fallen through this space, it is stopped by the catch or do
of the wheel g, when the carriage was drawn back by the
weight, the pinion o. was thrown into gear by the leaver
and the carriage again moves forward, and this operation is repea
until the timber or quarter is wholly sawed. All we claim as
invention, is the manner of presenting the stuff or timbe
to the saw by means of circular head-blocks, as is above de
scribed. In witness whereof we have hereunto se
our hands this twenty fifth day of October in the year of
Lord one thousand eight hundred & thirty four.

Witnesses

Samuel Swan
Reuben Swan

Otis Parker.
Daniel Parker.

1152 [illegible]